United States Patent
Kim et al.

(10) Patent No.: US 7,654,681 B2
(45) Date of Patent: Feb. 2, 2010

(54) SURFACE LIGHT SOURCE DEVICE USING LIGHT EMITTING DIODES

(75) Inventors: Yong Tae Kim, Gyunggi-do (KR); Min Sang Lee, Gyunggi-do (KR); Dong Yeoul Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/896,818

(22) Filed: Sep. 6, 2007

(65) Prior Publication Data

US 2008/0080165 A1 Apr. 3, 2008

(30) Foreign Application Priority Data

Oct. 2, 2006 (KR) .......................... 10-2006-97237

(51) Int. Cl.
*F21V 7/04* (2006.01)
(52) U.S. Cl. ............... 362/97.4; 362/601; 362/608; 362/97.3; 362/231
(58) Field of Classification Search ............... 362/231, 362/601, 618, 627, 97.1–97.4; 313/512, 313/635, 487; 349/68, 70
See application file for complete search history.

(56) References Cited

U.S. PATENT DOCUMENTS 4,882,617 A * 11/1989 Vriens ..................... 348/779

| | | | | |
|---|---|---|---|---|
| 7,245,072 B2 * | 7/2007 | Ouderkirk et al. | ........... | 313/502 |
| 7,367,691 B2 * | 5/2008 | Lin | .............................. | 362/293 |
| 2006/0098440 A1 * | 5/2006 | Allen | ......................... | 362/294 |
| 2007/0064446 A1 * | 3/2007 | Sharma et al. | .............. | 362/618 |
| 2007/0081329 A1 * | 4/2007 | Chua et al. | .................. | 362/231 |
| 2007/0091597 A1 * | 4/2007 | Wang et al. | ................. | 362/231 |
| 2008/0130290 A1 * | 6/2008 | Ohashi et al. | ............... | 362/296 |

FOREIGN PATENT DOCUMENTS

| JP | 2006-261554 | 9/2006 |
|---|---|---|
| KR | 10-2005-0046742 | 5/2005 |
| KR | 1020060025724 A | 3/2006 |
| KR | 10-2006-0053468 | 5/2006 |

OTHER PUBLICATIONS

Korean Office Action, with English Translation, issued in Korean Patent Application No. KR 10-2006-0097237, dated on Oct. 29, 2007.

* cited by examiner

*Primary Examiner*—Jong-Suk (James) Lee
*Assistant Examiner*—Leah S Lovell
(74) *Attorney, Agent, or Firm*—McDermott Will & Emery LLP

(57) ABSTRACT

A surface light source device using light emitting diodes, the device including: a housing having a top opening to emit light; a light emitting diode board disposed on an inner bottom surface of the housing, the board on which a plurality of light emitting diodes are arranged; and a color conversion laminate formed by depositing a plurality of phosphor-mixed resin layers containing phosphors, the layers disposed at a top of the opening of the housing and providing light having different wavelengths.

7 Claims, 3 Drawing Sheets

US 7,654,681 B2

SURFACE LIGHT SOURCE DEVICE USING LIGHT EMITTING DIODES

CROSS-REFERENCE TO RELATED APPLICATIONS

This application claims the priority of Korean Patent Application No. 2006-0097237 filed on Oct. 2, 2006, in the Korean Intellectual Property Office, the disclosure of which is incorporated herein by reference.

BACKGROUND OF THE INVENTION

1. Field of the Invention

The present invention relates to a surface light source device using light emitting diodes (LEDs), and more particularly, to a surface light source device using LEDs having a color conversion structure capable of providing high efficiency.

2. Description of the Related Art

In general, due to low-power driving and excellent light efficiency, semiconductor light emitting diodes (LEDs) are generally applied as liquid crystal display (LCD) backlight, vehicle light, and home lighting. However, LEDs emit light with a limited wavelength. Therefore, it is required a method of obtaining white light needed in surface light source.

There has been a method of providing a light source by combining LEDs having different wavelengths, respectively, complementary to each other. For example, there may be provided an LED assembly obtained by mixing LEDs emitting red, blue, and green light, respectively. On the other hand, LEDs emitting single-wavelength light may be provided as a light source. In this case, desired white light may be obtained by using a phosphor for wavelength conversion.

FIG. 1 is a side cross-sectional view illustrating a conventional white light surface light source device 10 using a phosphor.

Referring to FIG. 1, the white light surface light source device 10 includes a housing 11 having an open top surface and an LED board 12 disposed in the housing 11. A plurality of blue LEDs 15 is arranged on the LED board 12 to be electrically driven.

A color conversion layer 17 including a yellow emitting phosphor such as YAG($Y_3Al_5O_{12}$):Ce is disposed at a top of the housing 11. The color conversion layer 17 provides yellow light Y by converting a part of blue light B emitted from the LEDs 15. The yellow light Y is mixed with blue light B' that is not converted, thereby finally emitting desired white light.

However, generally, a combination of a yellow emitting phosphor such as YAG:Ce and a blue LED shows low color rendering properties. That is, since a wavelength of the white light obtained by using the yellow emitting phosphor is distributed only in blue and yellow, there is a limitation on embodying desired natural white light due to low color rendering properties.

SUMMARY OF THE INVENTION

An aspect of the present invention provides a surface light source device using light emitting diodes, the device capable of providing relatively higher color rendering index by employing a plurality of phosphors providing different wavelengths from one another, respectively, and greatly improving color conversion efficiency by appropriately changing a structure of color conversion layers.

According to an aspect of the present invention, there is provided a surface light source device using light emitting diodes, the device including: a housing having a top opening to emit light; a light emitting diode board disposed on an inner bottom surface of the housing, the board on which a plurality of light emitting diodes are arranged; and a color conversion laminate formed by depositing a plurality of phosphor-mixed resin layers containing phosphors, the layers disposed at a top of the opening of the housing and providing light having different wavelengths.

The plurality of phosphor-mixed resin layers may be deposited in such a way that a phosphor-mixed resin layer providing a relatively lower wavelength is disposed adjacent to the plurality of light emitting diodes.

The plurality of light emitting diodes may be one of an ultraviolet light emitting diode and a near ultraviolet light emitting diode.

The plurality of phosphor-mixed resin layers may include a phosphor-mixed resin layer containing a blue emitting phosphor, a phosphor-mixed resin layer containing a green emitting phosphor, and a phosphor-mixed resin layer containing a red emitting phosphor.

The color conversion laminate may be formed by sequentially depositing the phosphor-mixed resin layer containing a blue emitting phosphor, the phosphor-mixed resin layer containing a green emitting phosphor, and the phosphor-mixed resin layer containing a red emitting phosphor, from a location adjacent to the plurality of light emitting diodes.

The plurality of phosphor-mixed resin layers may be formed by mixing phosphor powders providing light having different wavelengths, respectively, with one of an epoxy-based resin and a silicone-based resin.

The housing may include an inner surface formed of a reflective surface to greatly improve overall brightness.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
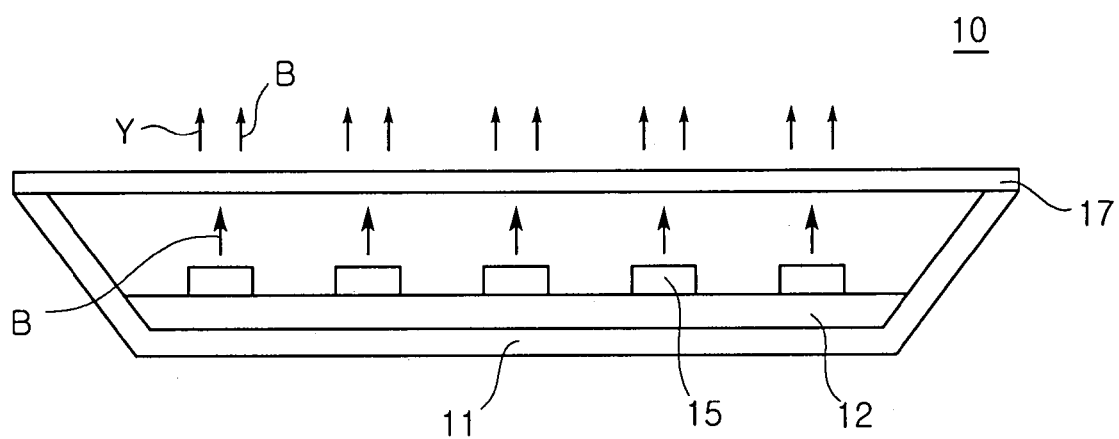
FIG. 1 is a side cross-sectional view illustrating a conventional surface light source device for lighting.
Figure 2:
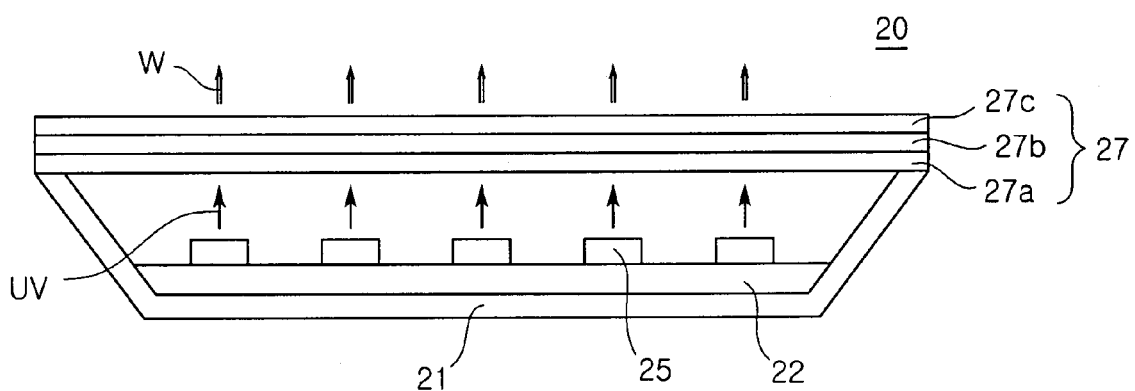
FIG. 2 is a side cross-sectional view illustrating a surface light source device according to an exemplary embodiment of the present invention.

FIG. 2 is a side cross-sectional view illustrating a surface light source device 20 for lighting, according to an exemplary embodiment of the present invention.

Referring to FIG. 2, the surface light source device 20 emitting white light includes a housing 21 having a top opening and a light emitting diode (LED) board 22 disposed in the housing 21. In this case, though not shown, to improve overall brightness, an inner surface of the housing 21 may be coated with a material such as a reflective metal to be provided as a reflective surface.

A circuit is provided to drive a plurality of LEDS 25. The circuit may be embodied to drive in parallel or in serial. The LED board 22 may be embodied as a printed circuit board (PCB). The LED 25 may be one of ultra violet and near ultra violet LED emitting light having a wavelength of 200 to 500 nm.

To improve color rendering properties, a color conversion structure employed in the present embodiment is embodied in the form of a laminate formed by depositing a plurality of phosphor-mixed resin layers manufactured by using two or more phosphors to convert into two or more different wavelength light complementary to each other.

For example, as in the present embodiment, a color conversion laminate 27 may include a phosphor-mixed resin layer 27a containing a blue emitting phosphor, a phosphor-mixed resin layer 27b containing a green emitting phosphor, and a phosphor-mixed resin layer 27c containing a red emitting phosphor. The color conversion laminate 27 including the phosphor-mixed resin layers containing three primary color phosphors, respectively, may provide more excellent color rendering properties than a general color conversion structure using a single phosphor.

Though not limited to, the blue emitting phosphor may be $(Sr,Ca)_5(PO_4)_3Cl:Eu^{2+}$, the green emitting phosphor may be $(Ba,Sr)_2SiO_4:Eu$, and the red emitting phosphor may be $K_5Eu_s(WO_4)_{2.5+1.5s}:Sm (1 \leq s \leq 5)$. Also, the phosphor-mixed resin layers 27a, 27b, and 27c may be manufactured by applying and drying slurries obtained by mixing respective phosphor powders with a transparent liquid resin.

The color conversion laminate 27 according to the present embodiment is capable of being formed by depositing and pressurizing the phosphor-mixed resin layer separately formed. However, the color conversion laminate 27 may be may be manufactured by forming a phosphor-mixed resin layer by applying and drying a resin slurry mixed with a phosphor powder and forming another phosphor-mixed resin layer by applying and drying a resin slurry mixed with another phosphor powder thereon. In this case, a transparent liquid resin used here may be one of an epoxy resin and a silicone resin.

In the present invention, color conversion efficiency may be greatly improved by appropriately determining an order of depositing the respective phosphor-mixed resin layers 27a, 27b, and 27c forming the color conversion laminate 27 by considering wavelength conversion efficiency of respective phosphors and excitability of a converted wavelength in different phosphors.

That is, as shown in FIG. 2, it is desirable to deposit in an order of the phosphor-mixed resin layer 27a containing the blue emitting phosphor, the phosphor-mixed resin layer 27b containing the green emitting phosphor, and the phosphor-mixed resin layer 27c containing the red emitting phosphor, from a position adjacent to the LEDs 25.

Figure 3:
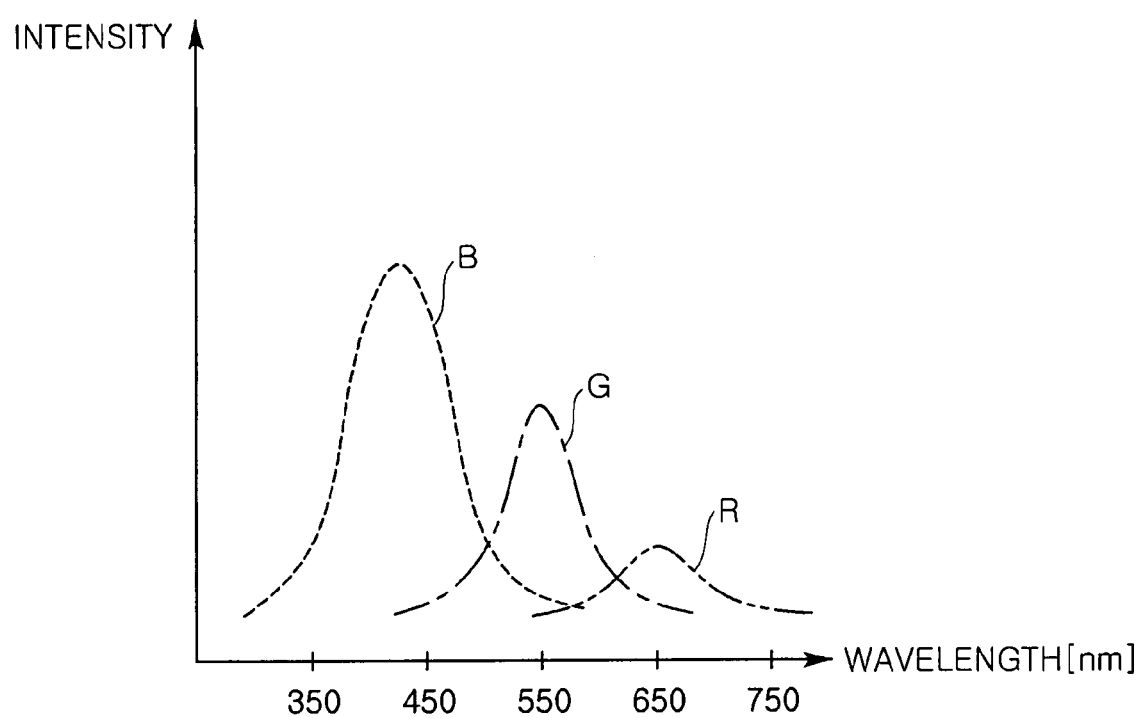
FIG. 3 is a graph illustrating conversion efficiency of red, green, and blue emitting phosphors capable of being employed by an exemplary embodiment of the present invention.

In the case of the three primary color phosphors R, G, and B used in the present embodiment, as shown in FIG. 3, the blue emitting phosphor shows the highest wavelength conversion efficiency and the red emitting phosphor shows relatively lower wavelength conversion efficiency.

Also, light having a relatively short wavelength helps an excitation of a phosphor providing light having a long wavelength, thereby improving an intensity of excited light of a long wavelength phosphor. Accordingly, since an intensity of light provided from the long wavelength phosphor having relatively lower conversion efficiency may be increased, thereby improving overall color conversion efficiency.

For example, according to the deposition order according to the present embodiment, when one of near ultraviolet light and ultraviolet light emitted from the LEDs 25 passes through the blue emitting phosphor-mixed resin layer 27a, a part is converted into blue light and another part arrives at the green emitting phosphor-mixed resin layer 27b with no change.

In this case, similar to the one of near ultraviolet light and ultraviolet light, the converted blue light may be converted into green light in the green emitting phosphor-mixed resin layer 27b depending on conversion efficiency of the green emitting phosphor. Accordingly, though having relatively lower conversion efficiency than that of the blue emitting phosphor, the green emitting phosphor may help conversion of the converted blue light into the green light. Therefore, an intensity of overall green light may be increased.

Similar to this, in the red emitting phosphor-mixed resin layer 27c, the converted blue light or the green light may help an excitation of the red light. Therefore, though efficiency of the red emitting phosphor is relatively low, an appropriate intensity of the red light may be obtained.

As described above, the deposition order of phosphor layers according to an exemplary embodiment of the present invention may be determined by considering that a short wavelength light previously excited may help an excitation of light from a long wavelength phosphor. Relatively higher color conversion efficiency may be obtained by determining the deposition order based on wavelengths of phosphors to solve a problem of conversion efficiency of a low long wavelength phosphor.

In the described above, the color conversion laminate 27 is a combination of the phosphor-mixed resin layers 27a, 27b, and 27c embodied as red, green, and blue emitting phosphors, respectively, which is not limited thereto.

That is, phosphor-mixed resin layers are appropriately embodied by using phosphor materials having different wavelengths complementary to each other, for example, a reddish yellow emitting phosphor and a bluish green emitting phosphor, thereby providing more excellent color rendering properties than those of a phosphor-mixed resin layer using only a yellow emitting phosphor. Also, high color conversion efficiency may be obtained by embodying a color conversion laminate having the deposition order as described above.

According to an exemplary embodiment of the present invention, a surface light source device having white light with excellent color rendering properties may be provided by embodying a color conversion layer as a laminate using a plurality of phosphor-mixed resin layers containing two different phosphors having complementary colors to each other, respectively. Particularly, a deposition order of a color conversion laminate is determined in such a way that a resin layer containing a short wavelength phosphor is disposed adjacent to a light source, depending on an excitation wavelength of respective phosphors, thereby greatly improving color conversion efficiency.

While the present invention has been shown and described in connection with the exemplary embodiments, it will be apparent to those skilled in the art that modifications and variations can be made without departing from the spirit and scope of the invention as defined by the appended claims.

What is claimed is:

1. A surface light source device using light emitting diodes, the device comprising:
   a housing having a top opening to emit light;
   a light emitting diode board disposed on an inner bottom surface of the housing, the board on which a plurality of light emitting diodes are arranged; and
   a color conversion laminate formed by depositing a plurality of phosphor-mixed resin layers containing phosphors, the layers disposed above the plurality of light emitting diodes to be perpendicular to each other, the layers disposed at a top of the opening of the housing and providing light having different wavelength, wherein the plurality of phosphor-mixed resin layers are deposited in such a way that a first phosphor-mixed layer adjacent the plurality of light emitting diodes provides a relatively lower wavelength than a second phosphor-mixed layer adjacent the plurality of light emitting diodes, wherein the first phosphor mixed layer is closer to the plurality of light emitting diodes than the second phosphor-mixed layer.

2. The device of claim 1, wherein the plurality of light emitting diodes is one of an ultraviolet light emitting diode and a near ultraviolet light emitting diode.

3. The device of claim 2, wherein the plurality of phosphor-mixed resin layers comprises a phosphor-mixed resin layer containing a blue emitting phosphor, a phosphor-mixed resin layer containing a green emitting phosphor, and a phosphor-mixed resin layer containing a red emitting phosphor.

4. The device of claim 3, wherein the color conversion laminate is formed by sequentially depositing the phosphor-mixed resin layer containing a blue emitting phosphor, the phosphor-mixed resin layer containing a green emitting phosphor, and the phosphor-mixed resin layer containing a red emitting phosphor, from a location adjacent to the plurality of light emitting diodes.

5. The device of claim 1, wherein the plurality of phosphor-mixed resin layers are formed by mixing phosphor powders providing light having different wavelengths, respectively, with one of an epoxy-based resin and a silicone-based resin.

6. The device of claim 1, wherein the housing comprises an inner surface formed of a reflective surface.

7. The device of claim 1, wherein the plurality of phosphor-mixed resin layers include a blue phosphor-mixed resin layer containing a blue emitting phosphor, a green phosphor-mixed resin layer containing a green-emitting phosphor, and a red phosphor-mixed resin layer containing a red emitting phosphor, and the blue phosphor-mixed resin layer, the green phosphor-mixed resin layer and the red-phosphor-mixed resin layer are positioned in that order from a position adjacent to the plurality of light emitting diodes.

* * * * *